United States Patent [19]

De Lange

[11] Patent Number: 5,719,593
[45] Date of Patent: Feb. 17, 1998

[54] SINGLE FRAME BUFFER IMAGE PROCESSING SYSTEM

[75] Inventor: Alphonsius A. J. De Lange, Eindhoven, Netherlands

[73] Assignee: U.S. Philips Corporation, New York, N.Y.

[21] Appl. No.: 575,801

[22] Filed: Dec. 22, 1995

[30] Foreign Application Priority Data

Dec. 23, 1994 [EP] European Pat. Off. ............. 94203749

[51] Int. Cl.$^6$ ........................................ G09G 5/00
[52] U.S. Cl. .................................. 345/114; 345/203
[58] Field of Search ............................ 345/113, 114, 345/115, 133, 136, 150–155, 186–189, 190–191, 200, 203; 348/594, 595, 597; 395/135

[56] References Cited

U.S. PATENT DOCUMENTS

| | | | |
|---|---|---|---|
| 4,591,842 | 5/1986 | Clarke, Jr. et al. | 345/150 |
| 4,745,407 | 5/1988 | Costello | 345/155 |
| 4,752,893 | 6/1988 | Guttag et al. | 345/155 |
| 4,901,250 | 2/1990 | Ishida | 345/189 |
| 4,951,229 | 8/1990 | Di Nicola et al. | 345/187 |
| 4,958,146 | 9/1990 | Priem et al. | 345/188 |
| 4,992,781 | 2/1991 | Iwasaki et al. | 345/115 |
| 5,128,658 | 7/1992 | Pappas et al. | 345/199 |
| 5,243,447 | 9/1993 | Bodenkamp et al. | 345/133 |
| 5,271,097 | 12/1993 | Barker et al. | 345/114 |

*Primary Examiner*—Steven Saras
*Attorney, Agent, or Firm*—Robert M. McDermott

[57] ABSTRACT

An image processing system processes background and foreground images and stores a combined image in a shared frame buffer. The images are processed such that mixing of the images and smooth transitions between the images can be achieved. The input images may be independently supplied and may have different refresh rates. The image processing system determines whether a position in a combined image is part of a predetermined background area, a predetermined foreground area or a predetermined mixing area. The mixing area includes mixing area positions, defined as positions in the combined image which correspond to a predetermined area of the corresponding foreground image. The foreground area includes foreground area positions, defined as positions in the combined image which correspond to the foreground image and which are not part of the mixing area. The background area includes background area positions, defined as positions in the combined image which correspond to the background image and which are not part of the mixing area or the foreground area. The image processing system additionally includes a display controller and a frame buffer coupled together. The display controller includes inputs and processors. The inputs receive digital background input pixels, which are a background input image, and receive digital foreground input pixels, which are at least one foreground input image. The processors process the input pixels and propagate the stream of processed pixels to memory elements of the frame buffer, forming a combined image.

19 Claims, 9 Drawing Sheets

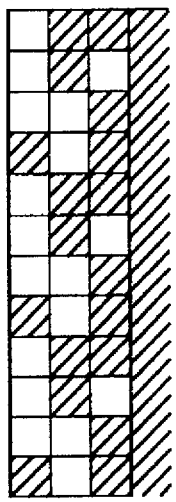 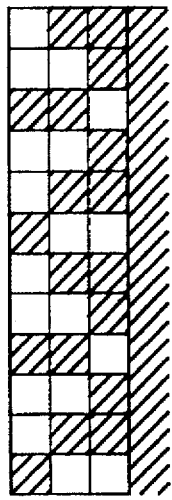 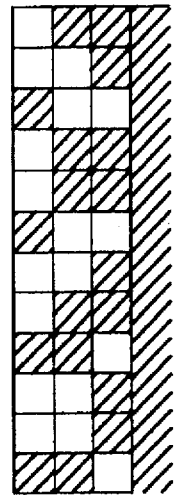 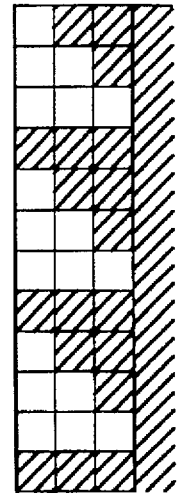
FIG. 8A  FIG. 8B  FIG. 8C  FIG. 8D
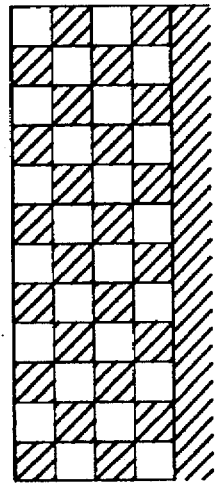 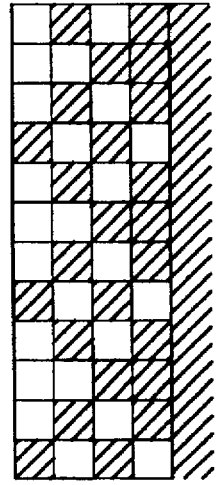 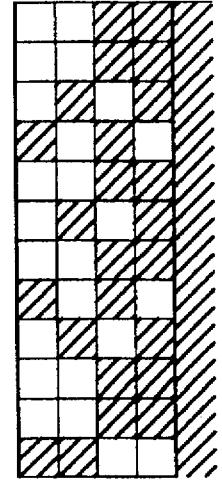
FIG. 9A  FIG. 9B  FIG. 9C

SINGLE FRAME BUFFER IMAGE PROCESSING SYSTEM

An in image processing system for processes background and foreground images and stores a combined image in a shared frame buffer. The image processing system includes display controller includes and a frame buffer coupled to the said display controller. The display controller includes an input for receiving digital background input pixels, which are a background input image, and digital foreground input pixels, which are at least one foreground input image; and for differentiating between background and foreground input pixels; and a processor for processing the input pixels and for propagating the stream of processed pixels to memory elements of the frame buffer means, which forms a combined image.

BACKGROUND OF THE INVENTION

Information displayed on a video display may take many forms. For example, it may be useful to display alphanumeric characters, graphical images, animations, still pictures or even full-motion video. Traditionally, image processing systems were designed to accommodate one or two of these types of information. Typically, display information was stored separately and only combined (multiplexed) when being displayed. As quality of the display systems increased (improved pixel and colour resolution), efforts have been made to reduce the costs of image processing systems by combining processing circuits and by combining image storage.

Such an image processing system is known from U.S. Pat. No. 5,243,447. The known system describes a single frame buffer video display system for combining both video and graphical images. The system utilises a display controller which processes the incoming graphics and video pixels. The pixels are stored in a single frame buffer in a single data format. The pixels may be read from the frame buffer by a conventional video generator for output to conventional display devices. The locations of memory elements in the frame buffer are matched to corresponding pixels on the display system. The described display controller incorporates a blender for combining the graphics and video images into a combined image. The blender may follow traditional chroma-keying or another desired graphic/video combining scheme to determine which graphics or video data input pixel will be stored in the frame buffer. This results in a combined image with sharp transitions between the composing images. Blending the images in such a way that mixing of the images occurs is not possible with the known system.

SUMMARY OF THE INVENTION

It is an object of the invention to provide an image processing system capable of combining background and foreground input images into a single frame buffer, in such a way that mixing of the images is possible. It is also an object of the invention that such a system is capable of accommodating input images, which are independently supplied and which have different refresh rates. It is a further object of the invention to provide an image processing system which enables combining the input images in such a way that a smooth transition occurs between the images.

To achieve this object, the system according to the invention is characterised in that said image processing system comprises means for determining whether a position in said combined image is part of a predetermined background area, a predetermined foreground area or a predetermined mixing area; said mixing area comprising mixing area positions, defined as positions in the combined image which correspond to a predetermined area of the corresponding foreground image; said foreground area comprising foreground area positions, defined as positions in the combined image which correspond to the foreground image and which are not part of said mixing area; and said background area comprising background area positions, defined as positions in the combined image which correspond to the background image and which are not part of said mixing area or said foreground area;

said display controller means comprises:
 means for determining for each input pixel a corresponding image position;
 means for determining for each image position a corresponding memory element;
 means for processing said foreground input pixels by propagating the foreground pixels to the corresponding memory elements, if the pixels correspond to foreground area positions; and by propagating a representative portion of the foreground pixels to the corresponding memory elements, if the pixels correspond to mixing area positions;
 means for processing said background input pixels by propagating the background pixels to the corresponding memory elements, if the pixels correspond to background area positions; and by propagating a representative portion of the background pixels to the corresponding memory elements, if the pixels correspond to mixing area positions.

The system in accordance with the present invention is capable of distinguishing between a background area, a foreground area and a mixing area of the combined image. The background area is the area of the combined image, which is not covered by the foreground image. The background area is, therefore, used for displaying only pixels of the background image. In the area of the combined image, which is covered by the foreground image, pixels of both images are available as input. This area is divided into two parts: the mixing area and the foreground area. The mixing area is used for displaying a mix of the background and the foreground image. The foreground area is used for displaying only pixels of the foreground image, making the corresponding part of the background image invisible. By limiting the mixing area to an edge area of the foreground image, smooth transitions between images can be achieved. Smooth transitions are considered to be aesthetically pleasing to the eye, particularly if the transitions occur between a softer video image and a sharper graphics image. Smooth transitions can also achieve the effect that an overlaid image seems to be part of the background image. This can be particularly advantageous if an animated object is overlaid on a background video image. Moreover, smooth transitions overcome aliasing problems, which may occur along the edge of a foreground image (the 'staircase' image artifact). Other artifacts, such as overshooting, which occur in the process of displaying a combined image, can be masked by smooth transitions.

The mixing area may also extend to the entire area covered by the foreground image, in which case the foreground area is reduced to zero. This achieves the effect of mixing two images, particularly if the foreground and background images cover the same area.

Since the memory elements of the frame buffer are not able to store the full information of two input pixels, the system has provisions to select in the mixing area representative portions of the information contained in both images. These portions are stored in such a manner that they can be accessed independently, ensuring that the images may be supplied at different moments in time and refreshed at different rates.

A first embodiment of a system according to the present invention is characterised in that said display controller means comprises means for dividing the mixing area positions into a first and second selection;

said representative potion of foreground pixels comprises the foreground pixels which correspond to said first selection of mixing area positions;

said representative portion of background pixels comprising the background pixels which correspond to said second selection of mixing area positions;

The resulting spatial distribution of pixels (some pixels originate from the foreground image, other pixels originate from the background image) achieves a mixing effect by viewing the displayed combined image from a sufficiently large distance, as usually is the case when watching television. The selection of image positions is chosen in such a way that a good representation of both contributing input images occurs. One way of achieving this is to assign image positions in the mixing area alternatingly to foreground and background input pixels. By repeating this pattern horizontally and vertically, an equal contribution occurs according to a 'chess-board' pattern.

In a further embodiment, said image processing system comprises delay means coupled to said frame buffer means and blender logic means coupled to said delay means and said frame buffer means;

said delay means having means for receiving a stream of pixels from said frame buffer means and means for generating the same stream of pixels with a time delay of one pixel;

said blender logic means comprising first and second input means; blending means; and output means;

said first input means having means for reading a stream of pixels from said frame buffer;

said second input means having means for reading a stream of pixels from said delay means;

said blending means having means for blending a pixel received by said first input means with a pixel received by said second input means, forming a blended pixel;

said output means having means for propagating said blended pixel if the pixel received by said first input means corresponds to a mixing area position; and for propagating the pixel received by said first input means if the pixel corresponds to a foreground area position or a background area position.

By mixing, in the mixing area, successive pixels before displaying the pixels, a good mixing effect is achieved even when viewed from nearby, as usually is the case for computer display monitors.

A second embodiment of a system according to the present invention is characterised in that said input pixels comprise a plurality of bits;

said memory elements of said frame buffer comprise substantially the same mount of bit storage locations as said plurality of input pixel bits;

said display controller means comprises means for dividing the bit storage locations of the memory elements, which correspond to mixing area positions, into a first and second selection;

said representative potion of foreground pixels, which correspond to mixing area positions, comprises a representative part of each foreground pixel, which is being propagated to said first selection of bit storage locations of the corresponding memory elements;

said representative portion of background pixels, which correspond to mixing area positions, comprises a representative part of each background pixel, which is being propagated to said second selection of bit storage locations of the corresponding memory elements.

In the mixing area, the frame buffer memory elements are used for storing information originating from both input images. To this end, the bit storage locations of a memory element are divided into two selections. The first selection is used for storing information related to the foreground input image pixel and the second selection is used for storing information related to the background input image pixel. A possibility is to store, for every pixel in the mixing area, the most significant bits of the foreground image pixel in half of the bit storage locations and to store the most significant bits of the background image pixel in the remaining bit storage locations. If no special precautions would be taken, the mixing effect could appear rather crude. As an example, if the most significant bit storage location is used for storing a bit of a foreground image pixel, then this bit would contribute half of the intensity of the resulting combined pixel. A marginal change in intensity of the foreground image pixel, resulting in a change of the bit, could result in a significant change of the intensity of the combined pixel. On the other hand, substantial changes in the intensity of the background pixel, could result in only small changes of the intensity of the combined image pixel.

In a further embodiment, therefore, said image processing system comprises blender logic means coupled to said frame buffer means;

said blender logic means comprising input means, blending means and output means;

said input means having means for reading a stream of pixels from said frame buffer;

said blending means having means for blending the value read from said first selection of bit storage locations with the value read from said second selection of bit storage locations, forming a blended pixel;

said output means having means for propagating said blended pixel if the pixel received by said first input means corresponds to a mixing area position; and for propagating the pixel received by said first input means if the pixel corresponds to a foreground area position or a background area position.

In this embodiment, blender logic means is used to process the pixels stored in the frame buffer before displaying the pixels. For mixing area pixels, the blender logic means retrieves the most significant bits of both contributing pixels and mixes both values together. This achieves a good mixing result.

Instead of using blender logic means to improve the mixing quality, in an alternative embodiment, said system comprises means for determining said representative part of the foreground input pixel by choosing a value which contributes to the combined image substantially half the value of the foreground input pixel when stored in the first selection of bit storage locations; and for determining said representative part of the background input pixel by choosing a value which contributes to the combined image substantially half the value of the background input pixel when stored in the second selection of bit storage locations.

Storing a predetermined selection of input pixel bits in the applicable bit storage locations, may not always result in a good contribution of the input pixel to the combined pixel. To overcome this problem, an optimum contribution of each foreground and background input pixel is determined and stored in the applicable bit storage locations. As an example, assume that intensity levels are stored as 8-bit values. Assume, further, that in the middle of the mixing area the bits have been assigned alternatingly to the foreground pixel and the background pixel, with the most significant bit being assigned to the foreground pixel, the next most significant bit being assigned to the background pixel, the next bit to the foreground pixel, etc. Assume that the foreground pixel has maximum intensity level, 255, and that it is preferred that both images contribute equally (half) to the combined image. Storing the four most significant bits of the foreground pixel would result in a contribution of 170 to the intensity of the combined pixel. In this case a preferred contribution of 128 can be achieved by setting only the most significant bit of the combined pixel.

These and other aspects of the invention will be described in detail hereinafter with respect to the drawing.

BRIEF DESCRIPTION OF THE DRAWINGS

FIGS. 7, 8 and 9 illustrate various pixel position patterns, according to which pixels may be selected from the background image and the foreground image.

DESCRIPTION OF THE PREFERRED EMBODIMENTS

Figure 1A:
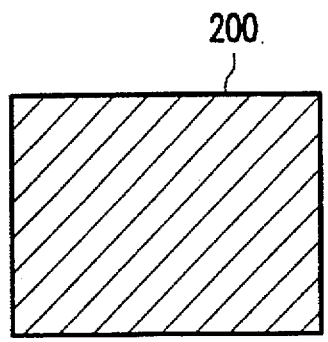
FIG. 1 illustrates background and foreground input images as might be presented to a display system.
Figure 1B:
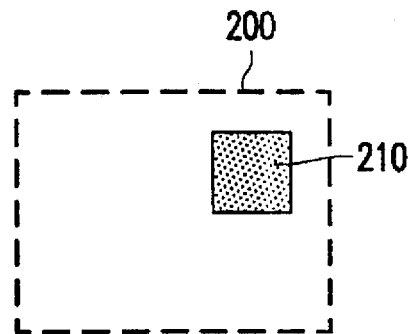
Figure 2A:
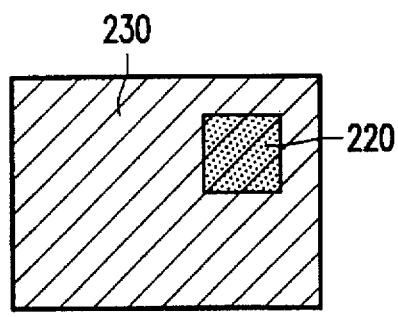
FIG. 2 illustrates foreground, background and mixing areas of a combined image.
Figure 2B:
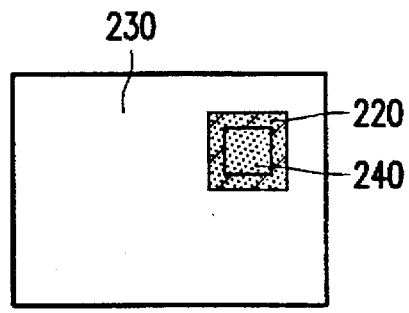

FIGS. 1 and 2 illustrate the composing of images. FIG. 1a shows a background input image, as might be presented to a display system. The image, indicated by hatched lines, covers the whole display area, shown as a large rectangle 200. FIG. 1b shows a foreground input image, indicated by a dotted pattern, which only covers part of the display area 200. This part is shown as a small rectangle 210. FIGS. 2a and 2b illustrate the resulting images after the background and foreground input images have been combined and stored in a shared frame buffer according to the present invention. In FIG. 2a, the combined image consists of a mixed image in the area shown as the small rectangle 220, further referred to as the mixing area, and of the background image in the remaining display area 230, further referred to as the background area. The mixing area 220 corresponds to the area 210 of figure 1b, which is covered by the foreground input image. The background area 230 corresponds to the area 200 of figure 1a, excluding the area 210 of figure 1b. Other results can be achieved by dividing the area covered by the foreground image (area 210 of figure 1b) into two parts. The first part is used for displaying a mix of the foreground and background image; whereas the second part is used for displaying the foreground image. The first part is referred to as the mixing area and the second part is referred to as the foreground area. An example of this is illustrated in FIG. 2b, in which the mixing area 220 is limited to an edge area of the foreground image. The foreground area 240 covers the remaining part of the foreground image. Mixing images in an edge area of the foreground image can achieve a smooth transition between the background and the foreground image.

The description of the present invention assumes that the images are supplied as streams of digitised data elements, referred to as pixels. Analogue images can be digitised using conventional analogue-to-digital converter circuits before being supplied as input images to the image processing system described by the present invention. If it would be required to scale an image to an appropriate size, conventional scaling circuits can be used. Similarly, conventional circuits can be used to extract a specific area from a larger image or change the position of an image. Such circuits may be used in combination with the present invention, but are not part of the invention and are not described further.

The foreground image may constitute any type of displayable information, such as full motion video, graphics, animations and alpha-numeric characters. Similarly, the background image may constitute a range of displayable information, including video and graphics. Although the description focuses on one background image and one foreground image, it will be obvious that the same techniques apply when more images are present. For example, assume that a background image is overlaid by a first foreground image, which in turn is partially overlaid by a second foreground image. The processing system may process the background image and the first foreground image according to the present invention. For the purpose of processing the second foreground image the composition of the background image and the first foreground image can be seen as the background image and the second foreground image as the foreground image.

Figure 3:
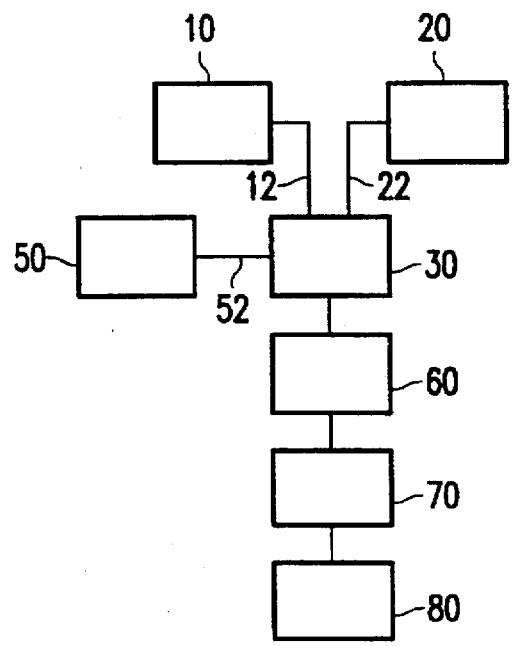
FIG. 3 shows a block diagram of an apparatus, which incorporates an embodiment of an image processing system in accordance with the present invention.

FIG. 3 shows a block diagram of an embodiment of an apparatus, which incorporates the image processing system of the present invention. The apparatus comprises a foreground image source 10 and a background image source 20, coupled to a display controller 30. The foreground image source 10 supplies a stream of foreground input image pixels to the display controller 30 via a foreground image connection 12. The background image source 20 supplies a stream of background input image pixels to the display controller 30 via a background image connection 22. The images may be supplied independently and refreshed at different rates. The display controller 30 receives image composition information from a CPU 50 via a composition connection 52. The display controller 30 processes the input pixels and propagates the pixels to memory elements of a frame buffer 60. The locations of the memory elements correspond to the image positions of the pixels. A video generator 70 reads pixels from succeeding memory elements of the frame buffer 60 and generates a corresponding video signal to be displayed on a video display 80. The image sources 10 and 20, the CPU 50, the video generator 70 and the video display 80 are known elements, which are not part of the present invention and are not described further.

Figure 4:
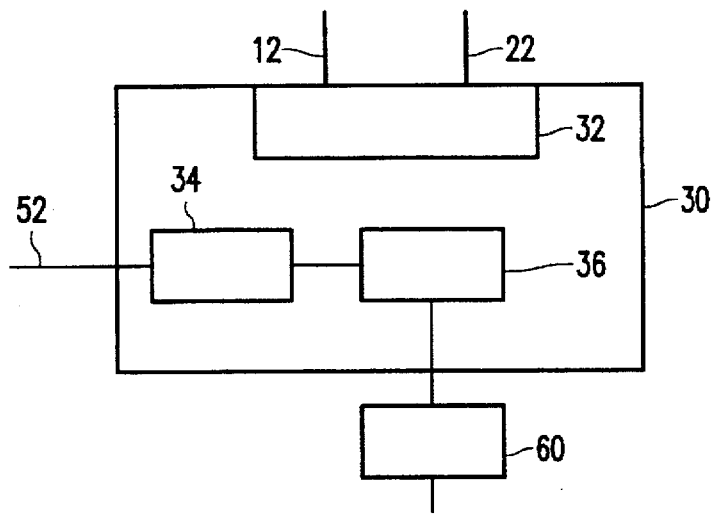
FIG. 4 shows a more detailed block diagram of the image processing system shown in FIG. 3.

FIG. 4 shows a detailed block diagram of an embodiment of the image processing system of the present invention. The display controller 30 comprises input means 32 for receiving the stream of foreground image input pixels from the foreground image source 10 via the foreground image connection 12 and for receiving the stream of background input image pixels from the background image source 20 via the background image connection 22. The input means 32 may, for example, be implemented using shift registers. The display controller 30 is able to differentiate between background and foreground pixels. If, for instance, separate shift registers are used for both streams of pixels, this information is inherent. If, on the other hand, the pixels streams are received via a shared I/O bus, the differentiation can be achieved using additional attribute information identifying the pixel type or source. The attribute information may, for instance, be supplied per pixel or per block of pixels. The attribute information may accompany the stream of pixels or may, alternatively, be accounted separately.

The display controller 30 is also able to determine a corresponding image position for each input pixel. This information may accompany the pixels in the form of attribute or addressing information. Alternatively, horizontal and vertical position counters can be maintained, which are reset whenever a new image arrives. The display controller 30 stores the image composition information, received via the composition connection 52 from the CPU 50, in a composition memory 34. The composition information stored in the composition memory 34 allows a processing means 36 to determine for every input pixel, based on its image position, whether it falls in a background area, a mixing area, or a foreground area of the total display area covered by the combined image. These areas are illustrated in FIGS. 2a and 2b. The mixing area 220 is used for displaying a mix of the foreground image and the background image. The foreground area 240 is used for displaying the remaining part of the foreground image (making the corresponding part of the background image invisible). The remaining display area, the background area 230, is used for displaying the remaining part of the background image.

The image composition information stored in the composition memory 34 may take several forms. Some examples are:

A two-bit plane, comprising two bits for every image position. The first bit indicates whether or not a foreground pixel should be propagated to the corresponding memory element of the frame buffer 60 (and subsequently be displayed at the corresponding image position). The second bit indicates whether or not a background pixel should be propagated to the corresponding memory element of the frame buffer 60. Mixing should take place if the bits indicate that a foreground pixel and a background pixel should be propagated to the corresponding memory element of the frame buffer 60.

A one-bit plane, comprising one bit for every image position. The bit indicates whether or not the corresponding image position is covered by the foreground input image. If mixing is required for only a limited edge area of the foreground image, it is sufficient to additionally store the widths of the edge area. In the composition as shown in FIG. 2b, where the edge area 220 has the same pixel width around the whole edge, the width needs to be stored as only one value. This information combined with the information stored in the bit plane, makes it possible to distinguish between the mixing area and the foreground area.

Figure 5A:
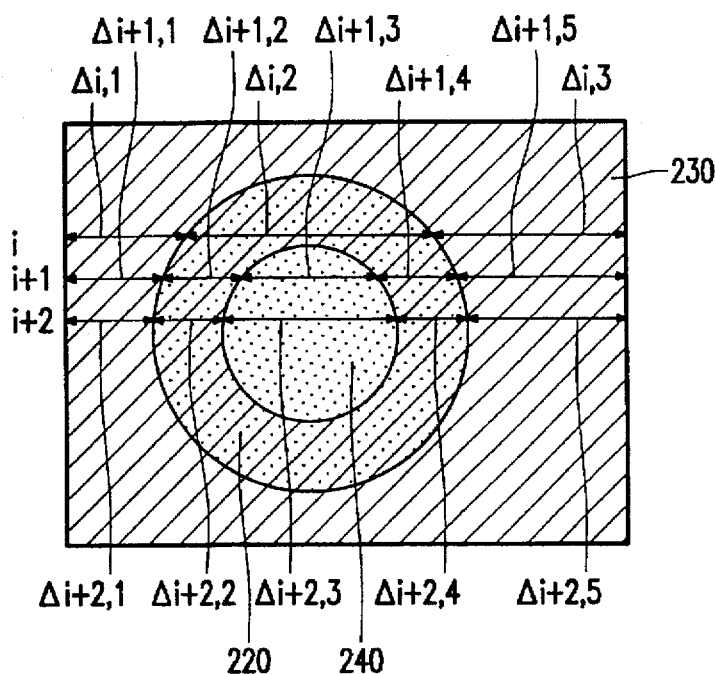
FIG. 5 illustrates the use of run-lengths to store image composition information.

One-dimensional run-lengths, as illustrated in FIG. 5a. The figure shows a background area 230, a mixing area 220 and a foreground area 240. Every line on the display, indicated as i, i+1, ..., is split into at least one segment $\Delta_{i,j}$, where new segments start at the position at which a transition occurs to another area. For every segment $\Delta_{i,j}$ the type of area is stored as well as the length of the segment. The index j indicates the $j^{th}$ transition on that specific line. As an example, line i+1 comprises five segments. The third segment $\Delta i+1_{,3}$ on this line corresponds to the foreground area 240. The lengths can conveniently be used by the processing means 36 as a loop counter indicating how many subsequent pixels should be processed according to a specific procedure. The lengths can also be used to calculate the horizontal start position of a segment by adding the lengths of the preceding segments together. The horizontal end position can be calculated by adding the segment length to the horizontal start position. Using the line information (vertical position) and the horizontal start and end positions of a segment, a corresponding segment can be located for every image position. Since the area type of a segment is stored, the corresponding area of each image position can be determined.

Figure 5B:
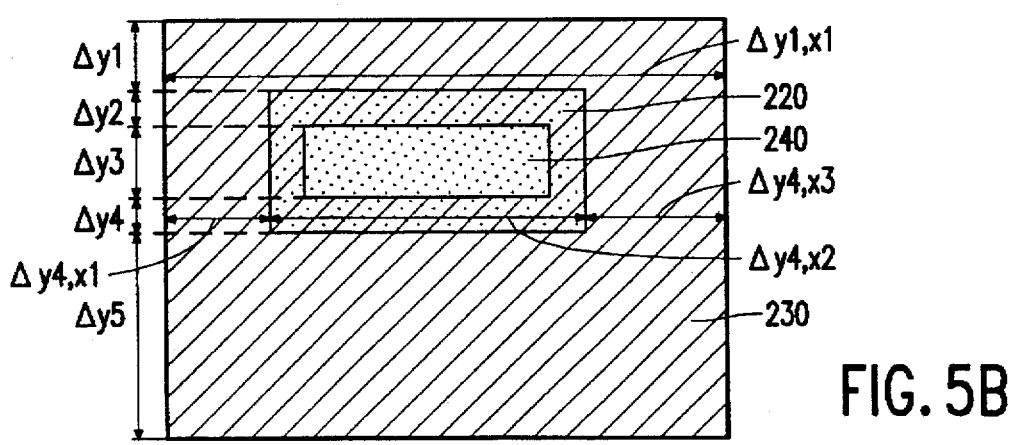

Two-dimensional run-lengths, as illustrated in FIG. 5b, can be used for rectangular foreground images. In this case the image is divided into vertical segments $\Delta y_i$, each covering a number of successive lines. The index i indicates the number of the vertical segment. New vertical segments start at the line which covers other areas than the preceding line. Every vertical segment $\Delta y_i$ is divided into at least one horizontal segment $\Delta y_i$, $X_j$. The index j indicates the number of the horizontal segment. A new horizontal segment starts at the position at which a transition occurs to another area. Since this method is used for rectangular images, the transition occurs at the same horizontal position for all lines in the specific vertical segment $\Delta y_i$. The composed image shown in FIG. 5b consists of five vertical segments ($\Delta y_1$ to $\Delta y_5$). As an illustration the horizontal segments are shown for vertical segment $\Delta y_1$ (only one horizontal segment $\Delta y_1, x_1$,) and vertical segment $\Delta y_4$ (three horizontal segments $\Delta y_4, x_1$ to $\Delta y_4, X_3$). For every segment $\Delta y_i, X_j$ the type of area is stored.

It will be apparent that in alternative embodiments of the present invention, the composition memory 34, shown in FIG. 4, can be external to the display controller 30 and, particularly in the case of bit planes, can be conveniently combined with the frame buffer means 60. Alternatively, the composition memory 34 can be combined with the memory of the CPU 50 of FIG. 3.

The processing means 36 propagates pixels to the memory elements of the frame buffer 60. The locations of the memory elements correspond to the image positions of the pixels. Using the information stored in the composition memory 34, the processing means 36 processes the input pixels as follows:

If the foreground input pixels fall in the foreground area, they are propagated to the corresponding memory elements of the frame buffer 60.

If the foreground input pixels fall in the mixing area, a representative potion is selected and propagated to the corresponding memory elements of the frame buffer 60.

If the background input pixels fall in the background area, they are propagated to the corresponding memory elements of the frame buffer 60.

If the background input pixels fall in the mixing area, a representative portion is selected and propagated to the corresponding memory elements of the frame buffer 60.

In this manner a combined image is formed in the frame buffer.

Figure 6:
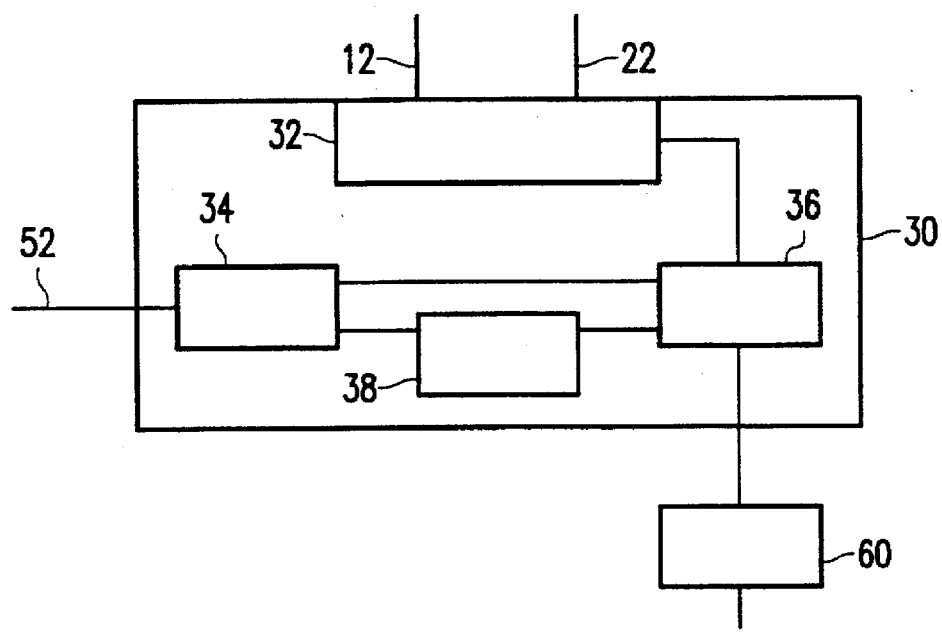
FIG. 6 shows a block diagram of an embodiment of the image processing system, which in the mixing area stores in the frame buffer a selection of foreground image pixels complemented by a selection of background image pixels.

FIG. 6 shows a further embodiment in which, the display controller 30 comprises means 38 for dividing the image positions in the mixing area into two selections. The first selection is used for displaying foreground pixels and the second selection is used for displaying background pixels. If both input images contribute sufficiently to the mixing area, the viewer gets the impression of mixing, particularly, when the display is viewed from a sufficiently large distance, as usually is the case when watching television. Using the information stored in the composition memory 34, the processing means 36 determines in which area the input pixels fall. For input pixels, which correspond to the mixing area, the processing means 36 uses the information supplied by the dividing means 38 to determine in which selection the input pixels fall. Based on this, the processing means processes the input pixels as follows:

If the foreground input pixels fall in the foreground area, they are propagated to the corresponding memory elements of the frame buffer 60.

If the foreground input pixels fall in the first selection of the mixing area, they are propagated to the corresponding memory elements of the frame buffer 60.

If the background input pixels fall in the background area, they are propagated to the corresponding memory elements of the frame buffer 60.

If the background input pixels fall in the second selection of the mixing area, they are propagated to the corresponding memory elements of the frame buffer 60.

Figure 7:
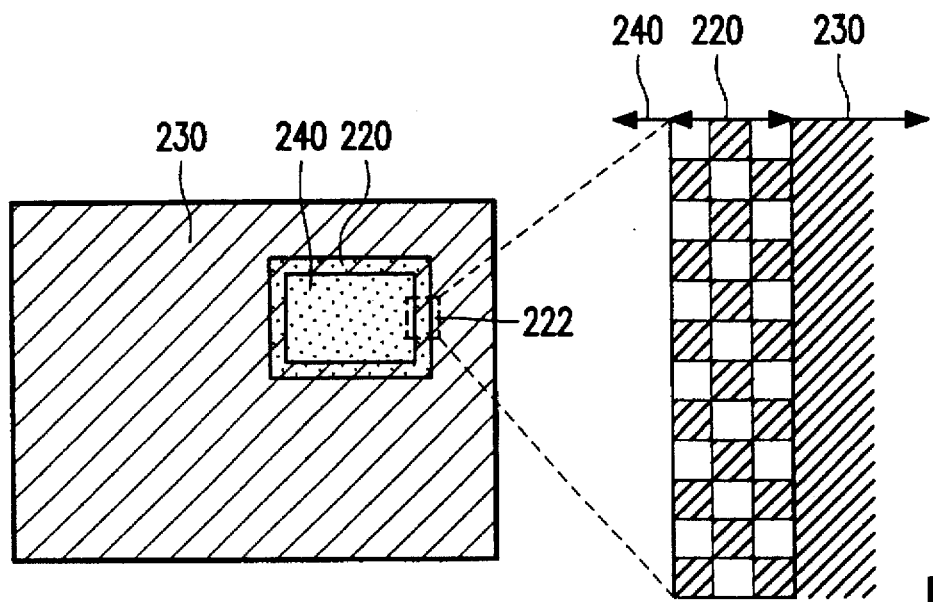

To illustrate some methods for dividing the mixing area into two selections, a small pan of the mixing area 220, indicated by the dotted rectangle 222 in FIG. 7, is enlarged to show the individual pixel positions. Various selections are shown as patterns in FIGS. 7, 8a to 8d and 9a to 9c. Pixel positions with a hatched pattern are used for displaying background pixels; pixel positions with no pattern (white) are used for displaying foreground pixels. In the first pattern (FIG. 7), foreground and background pixels are displayed alternatingly (a chess-board pattern). This results in an equal contribution of both images over the entire mixing area. The mixing area shown in FIG. 7 consists of an edge area of three pixels wide. Other widths, such as two or four pixels, can also be used. The mixing area may also comprise other areas of the foreground image besides the edge area. The mixing area may even cover the entire area of the foreground image.

The level of mixing of two images is usually described using an $\alpha$-factor: a pixel of the combined image consists of $\alpha$ times the foreground image pixel and $(1-\alpha)$ times the background image pixel, where $\alpha$ ranges from 0 to 1. Although in this embodiment individual pixels are not mixed, the viewer experiences a mixing effect by viewing the displayed image from a sufficiently large distance (spatial mixing). The effective value of $\alpha$ as observed by the viewer, can be influenced by selecting different numbers of pixels from a specific input image (more pixels selected from an image result in a higher contribution of the image to the combined image; less pixels in a lower contribution). FIG. 8 shows four patterns in which the $\alpha$-factor, shown at the top, is changed over the mixing area, achieving a particularly smooth transition from one image to another.

As an example, the mixing area shown in FIG. 8 consists of an edge area of three pixels wide. The majority of the positions, which are nearer the foreground area than the background area, is used to display foreground pixels. Half of the positions in the middle of the edge area are used to display foreground pixels. Similarly, the minority of the positions, which are nearer the background area than the foreground area, is used to display foreground pixels. FIG. 9 illustrates a mixing area, which consists of an edge area of four pixels wide. The observed $\alpha$-factors are shown at top.

By displaying the combined image on an interlaced display operating at less than 100 Hz., flickering can occur when a pixel gets isolated (the neighbouring pixels originate from another input image). The patterns shown in FIG. 7, 8 and 9 avoid this by ensuring that the pixels in the mixing area have at least one neighbouring pixel originating from the same input image (either vertically or diagonally).

Figure 10:
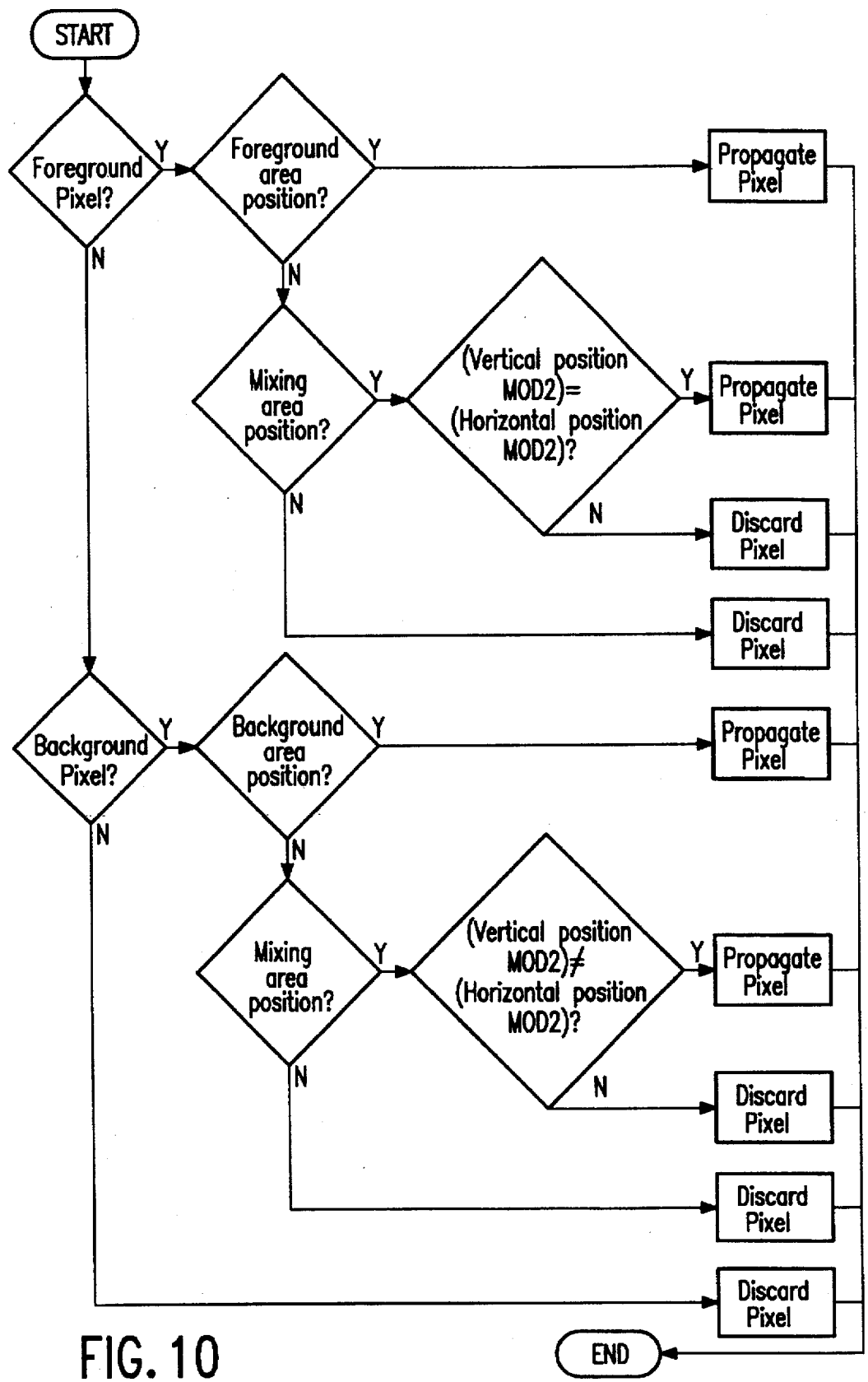
FIG. 10 shows a flow-diagram of a program for propagating a selection of foreground image pixels complemented by a selection of background image pixels.

It can easily be recognised that the role of dividing the mixing area into two selections, as executed by the dividing means 38 of FIG. 6, can, in an alternative embodiment, be executed by the processing means 36. As an example, the processing means 36 can be programmed to process the input pixels as shown in the flow-chart of FIG. 10. This program would mix the pixels according to the 'chess-board' pattern. Similar algorithms can be used to generate other patterns.

It will also be recognised that in an alternative embodiment the role of the dividing means 38, as shown in FIG. 6, can also be conveniently executed by the CPU 50 of FIG. 3. The CPU 50 can provide the pattern information to the display controller 30 in combination with the composition information 52 to be stored in the composition memory 34. As an example, the composition information 52 can take the form of a one-bit plane, comprising one bit for every image position. The bit indicates whether a foreground pixel or a background pixel should be propagated to the corresponding memory element of the frame buffer for subsequent display at the corresponding image position. In this case the CPU 50 can alternate the bits in the mixing area according to the required pattern. Alternatively, using one-dimensional run-lengths, the CPU 50 can provide for each segment a processing pattern, corresponding to the type of area. If different levels of mixing are required for a segment, then the CPU 50 can provide a series of patterns for each segment. As an example, FIG. 9b shows a mixing area with three mixing levels. In this case the CPU 50 can provide a start pattern (corresponding to α=¾) of one pixel long, a continuation pattern (corresponding to α=½) of two pixels long and a stop pattern (corresponding to α=¼) of one pixel. Particularly along the top edge of an image, the patterns may be much longer.

Images may be refreshed at different rates, depending on the nature of the information contained in the image. Full motion video images are typically refreshed at 25 or 30 Hz., whereas a teletext page is only refreshed every couple of seconds. On screen display (OSD) information may not be refreshed at all, whereas animated graphics may require a peak refresh rate higher than 30 Hz. To accommodate these different types of images, the display controller 30 must be able to process the foreground and background input images independently (at different moments in rime and at different refresh rates). This can be achieved by using a frame buffer 60 which supports writing of image pixels, without affecting the already stored pixels, which originate from another image. An example of such a frame buffer is a frame buffer with a random access port (pixels can be written independently). Such frame buffers are, for instance, manufactured and marketed by NEC Corporation. Also a frame buffer with a serial input port, which supports masked access to memory elements, can be used (a stream of pixels is stored in successive memory elements; some pixels, indicated using a bit mask, are skipped, without affecting the previously stored pixel value). Examples of such devices are synchronous GRAMs (μPD481850) manufactured and marketed by NEC Corporation and page mode DRAMs (MT4C1668/9) manufactured and marketed by Micron Technology Inc..

Figure 11:
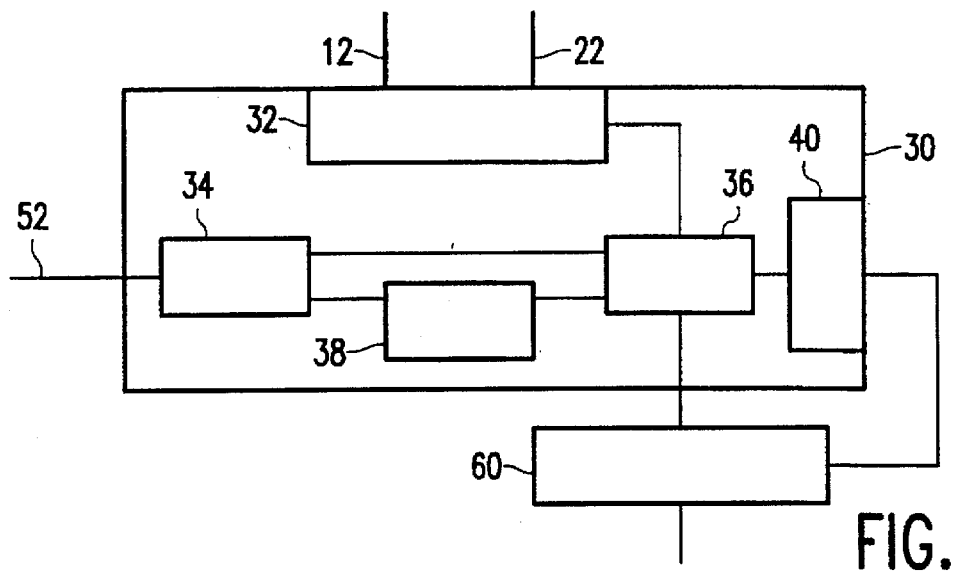
FIG. 11 shows a block diagram of an embodiment of the image processing system in which a frame buffer with conventional serial input and output ports is used.

FIG. 11 shows a further embodiment of the display controller 30 and the frame buffer 60 according to the present invention. In this embodiment, a frame buffer 60 is used, which supports conventional serial input and output operations. An example of such frame buffers are synchronous DRAMs (SDRAMs), which are readily available. Using such a frame buffer, writing a stream of pixels affects all successive memory elements corresponding to the stream (no memory elements in the range can be skipped). To be able to write a stream of mixing area pixels, comprising pixels of both images, the display controller 30 must have simultaneous access to pixels of both images. To achieve this, even in a situation where the images are supplied independently, the display controller 30 comprises a second input means 40 for reading a stream of previously stored pixels from the frame buffer 60. The reading is synchronised with the stream of input pixels which are currently being received by the first input means 32. The processing means 36 selectspixels from the stream received by the first input means 32 according to the display area and mixing pattern and combines the selected pixels with the stream received by the second input means 40. Next, the processing means 36 propagates the combined stream to the frame buffer 60. Obviously, the serial input and output operations may be supported by the frame buffer 60 in the form of separate ports but can also be supported in the form of a fast bi-directional port.

Figure 12:
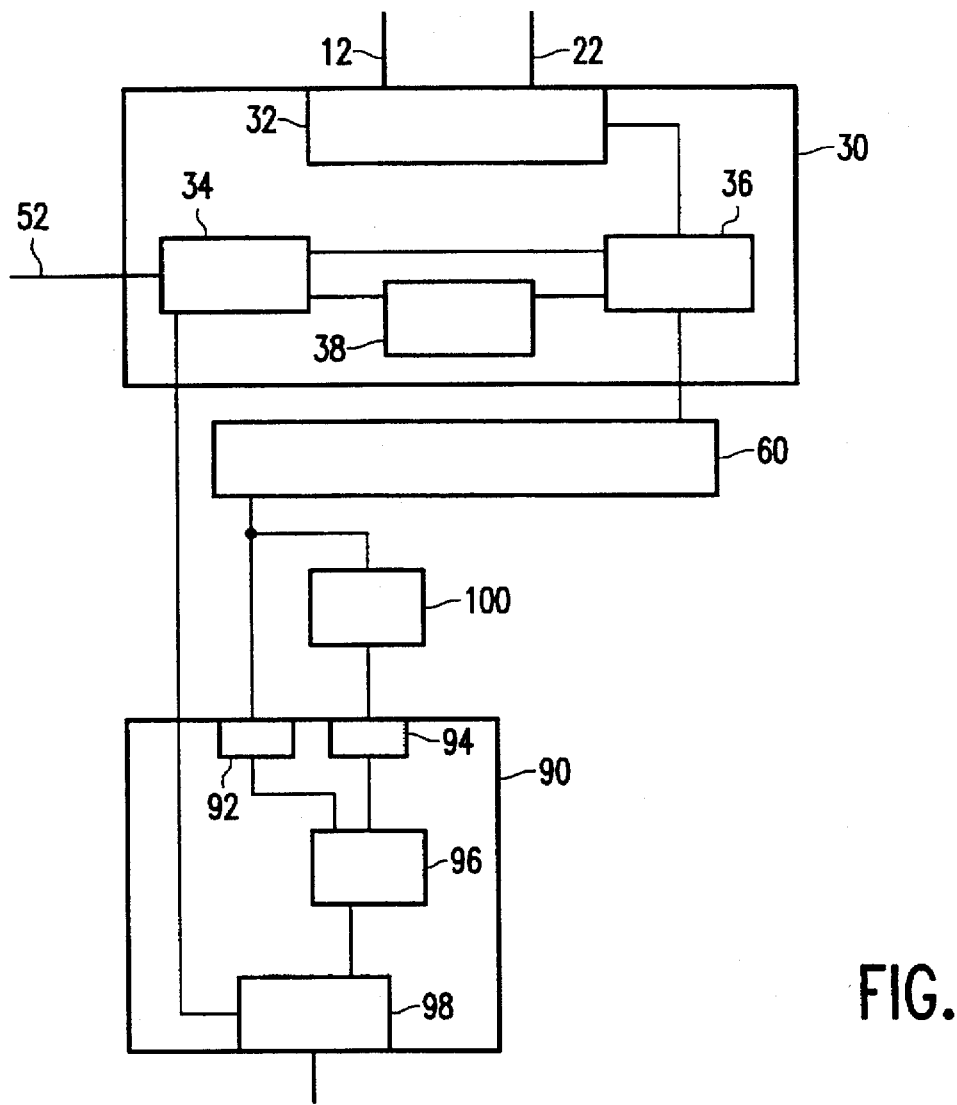
FIG. 12 shows a block diagram of an embodiment of the image processing system in which additional blender logic is used to process pixels stored in the frame buffer before displaying the pixels.

In a further embodiment of the present invention, as shown in FIG. 12, the image processing system comprises blender logic means 90 coupled to the frame buffer 60. The display controller 30, which is the same as shown in FIG. 6, has performed the described processing of input pixels, which has resulted in forming a combined image stored in the frame buffer 60. The blender logic means 90 reads the pixels from the frame buffer means 60 and propagates the pixels further to, for instance, the display generator 70 of FIG. 3. Additionally, the blender logic means 90 blends the pixels which correspond to the mixing area before propagating the pixels. This achieves a good level of mixing even when the display is viewed from nearby, as usually is the case for computer displays. The blender logic means 90 comprises a first and second input means for reading streams of pixels. The first input means 92 is coupled to the frame buffer 60. The second input means 94 is coupled to delay logic means 100. The delay logic means 1130 uses conventional circuits, such as flip-flops or shift registers, to delay the stream of pixels read from the frame buffer 60 with a time delay, which corresponds to the time interval between receiving successive pixels. The blender logic means 90 further comprises means 96 for blending a pixel received via the first input means 92 with a pixel received via the second input means 94. As an example, blending can be achieved by dividing both input pixels by 2 (shift operation) and adding the resulting values together. Also included in the blender logic means 90 is an output means 98 for propagating pixels. The information stored in the composition memory 34 is used to determine whether a pixel received via the first input 92 is part of the mixing area or not. If the pixel is part of the mixing area, then the blended pixel is propagated. If the pixel is not part of the mixing area then the pixel is propagated unblended. Using the described embodiment, a pixel in the mixing area is blended with the immediately preceding pixel on the same display line. It will be obvious to those skilled in the art that various other blending schemes can also be applied. For instance, blending could be extended to include more pixels on the same image line (preceding or succeeding) or to include pixels on neighbouring lines (preceding or succeeding). On the other hand, blending could also be limited to certain pixels. As an example, instead of blending successive pixels, even if the pixels originate from the same input image, the blending could be restricted to those pixels which originate from different input images by using the specific pattern information.

It will be recognised that the role of the delay logic means 100 and the blender logic means 90, in an alternative embodiment can be conveniently combined with the display controller 30. Additionally, the role of the video generator 70 of FIG. 3 can be combined with the display controller 30.

Image pixels can be represented using a variety of data formats, including colour-space models, such as RGB, and luminescence-based models, such as YUV. Some data formats are more suited for graphics images, whereas others are more appropriate for video images. Moreover, images can be represented using different mounts of bits. For instance, 6 or 8 bits are commonly used for the colour or luminance/chrominance intensity levels. For the purpose of the present invention's embodiment, it will be assumed that 8 bits are used for the individual intensity levels. Examples of such formats are 24-bit RGB (three 8-bit colour intensity levels) and 16-bit 4:2:2 YUV (one 8-bit luminance intensity levels; two 8-bit chrominance intensity levels, which are alternatingly stored for successive pixels). It is also assumed that the input images are supplied in the same data format. If the input image pixels would have different formats, conventional circuits can be used to convert the pixels to a common format. Alternatively, various methods are known for processing and storing pixels of different format, for instance by maintaining format attributes. The present invention may be applied regardless of the data format and mount of bits being used. Those skilled in the art will recognise that particularly for YUV care has to be taken that not one chrominance component gets lost (since the U and V chrominance components are normally already stored alternatingly for successive pixels, it may be preferred to store in the mixing area a chrominance component every fourth pixel if the required mixing level is α=½).

Figure 13:
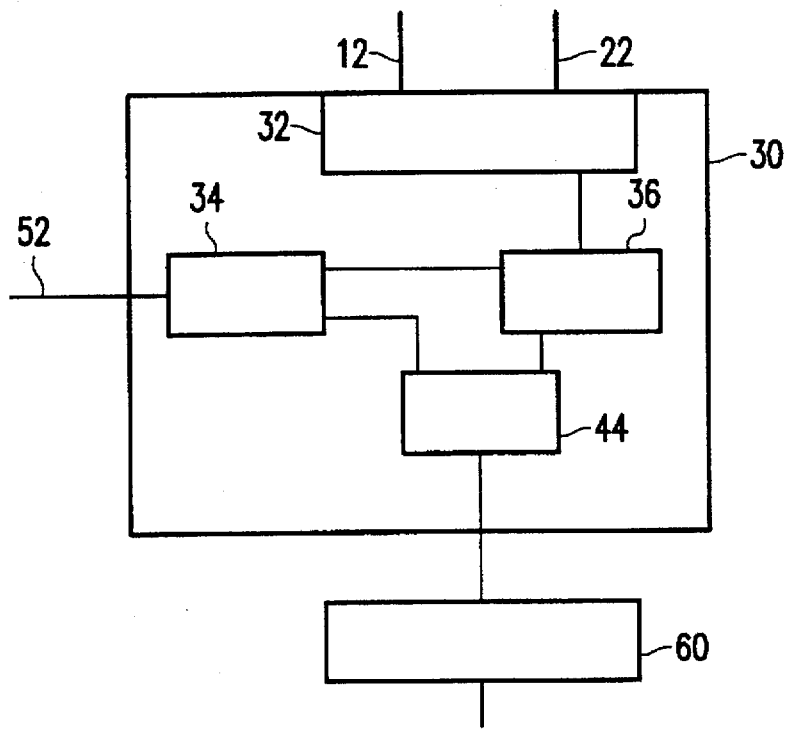
FIG. 13 shows a block diagram of an alternative image processing system, which in the mixing area stores a representation of the foreground image pixel in a selection of bit storage locations and a representation of the background image pixel in the remaining bit storage locations.

FIG. 13 shows an alternative embodiment in which the display controller 30 comprises means 44 for dividing the bit storage locations of the memory elements, which correspond to mixing area positions, into two selections. Of each memory element the first selection of bit storage locations is used for storing a representative part of a foreground input pixel; the second selection is used for storing a representative part of a background input pixel.

Figure 14:
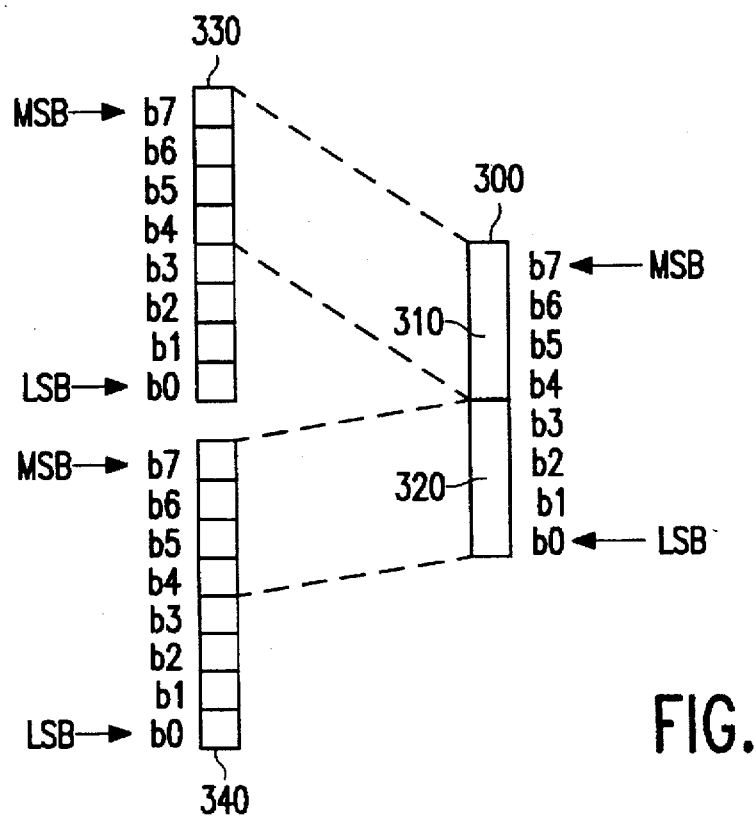
FIGS. 14 and 15 illustrate various bit storage location patterns, according to which the representation of the foreground image pixel and the representation of the background image pixel may be stored.

An example of the two selections is shown in FIG. 14, using 8-bit intensity levels. For reasons of clarity only one 8-bit field is shown for a pixel, although pixels are typically represented and stored as two or three 8-bit fields. Each memory element 300 is divided into a first selection 310 and a second selection 320. The first selection of bit storage locations 310 comprises the four most significant bits and the second selection 320 comprises the four least significant bits. The four most significant bits of the foreground pixel 330 are stored in the first selection 310 and the four most significant bits of the background pixel 340 are stored in the second selection 320.

Figure 15:
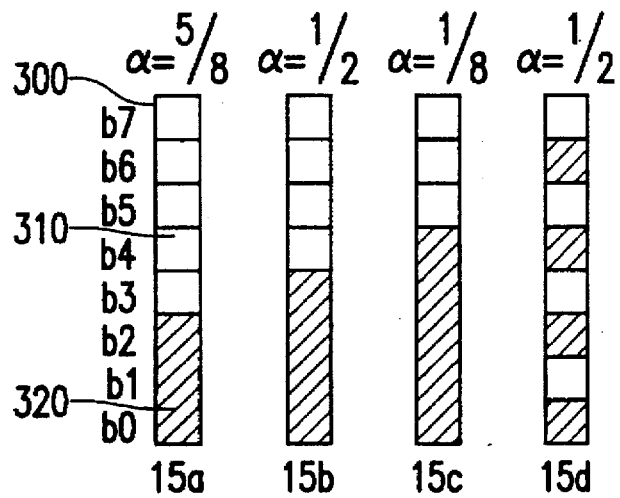

A number of alternative selections are illustrated in FIG. 15. The bit storage locations which form the second selection (assigned to the background image) are shown using a hatched pattern. Normally, the bit storage locations are assigned evenly to both input images, as shown in FIGS. 15b and 14. If the α-factor of an input image is substantially less than 0.5, it can be preferred to assign less input bits to this input image. As an example, if α=0.125 it would be sufficient to use five bits to store the full contribution of the foreground pixel to the combined pixel (using binary calculation, a maximum intensity of the foreground pixel of 255, would result in a maximum contribution of 31, which can be stored using five bits). Eight bits would still be required to store the full contribution of the background pixel (maximum intensity: ⅞×255). Ideally a total of 13 bits (five plus eight) would be used to fully store both contributions. Since only eight bits are available, the selection shown in FIG. 15c is a good alternative to the selection shown in FIG. 15b. In 15c three bits (approximately 5* (8/13)) are assigned to the foreground image and five bits (approximately 8* (8/13)) are assigned to the background image. Using this method, the storage locations are divided in such a way that the image with the highest mixing factor (α-factor) gets assigned a majority of bit storage locations. The α-factors, shown on top of FIG. 15a to 15d, represent possible contributions of the background image. As an alternative to the selection shown in FIG. 15b, FIG. 15d illustrates a selection in which the storage locations have been assigned alternatingly.

Storing a selection of pixel bits can be achieved by using a frame buffer 60 which supports writing of pixel bits to specific storage locations of a memory element, without affecting the remaining storage locations of the memory element. Such functionality is, for instance, offered by frame buffers with a serial input port, which supports masked access to memory element storage locations. An example of such a frame buffer is the synchronous GRAM manufactured and marketed by NEC Corporation. Using such a frame buffer, the dividing means 44 of FIG. 12 provides the required mask pattern to the frame buffer. It will be recognised that this role can also be conveniently executed by the processing means 36.

Figure 16:
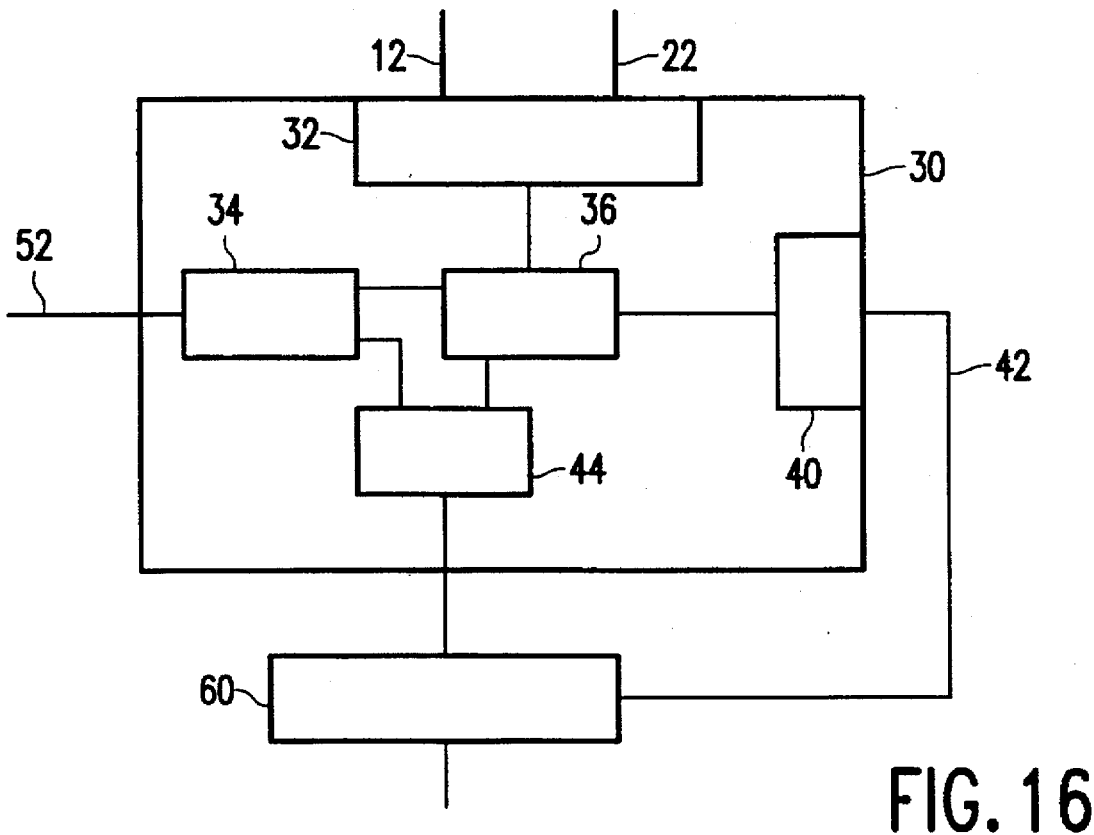
FIG. 16 shows a block diagram of the image processing system shown in FIG. 13, in which a frame buffer with conventional serial input and output ports is used.

FIG. 16 shows an alternative embodiment for storing a selection of pixel bits. In this embodiment a frame buffer 60 is used, which only supports conventional serial input and output operations. Writing to a memory element of such a frame buffer affects all bit storage locations of the memory element. In order to use such a frame buffer, the display controller 30 comprises a second input means 40 for reading a stream of previously stored pixels from the frame buffer 60. The reading is synchronised with the stream of input pixels which are currently being received by the first input means 32. As an example, it is assumed that at a certain moment in time the first input means receives foreground input pixels, which correspond to the mixing area, and it is assumed further that the chosen selection of bit storage locations is as shown in FIG. 14. In this case, the four most significant bits of the foreground input pixel are selected. This can for instance be achieved by performing a bit-wise AND operation on the pixel intensities, using the hexadecimal mask 'F0', with the most significant mask nibble having the hexadecimal value 'F'. Similarly, the four least significant bits are selected from the pixel stream read from the frame buffer 60 by the second input means 40. This can for instance be achieved by performing a bit-wise AND operation on the pixel intensities, using the hexadecimal mask 'F0'. These four least significant bits contain the four most significant bits of the background input pixel, as has been stored previously. Next, both streams are combined (for instance by performing a bit-wise OR operation) and propagated to the frame buffer 60. As an alternative to using conventional logic to perform these operation, also the processing means 36 can be programmed to perform these operations. In such a situation, the masks can be incorporated into the program code, or, alternatively, be available to the program in the form of dam.

Figure 17:
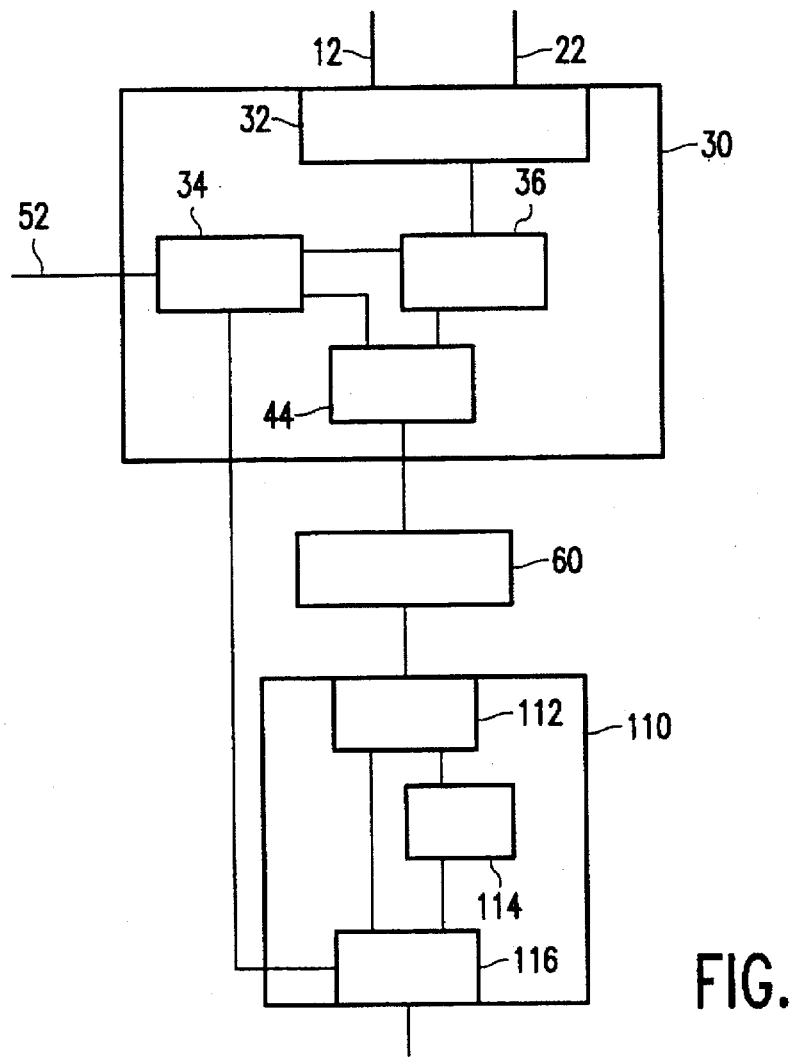
FIG. 17 shows a block diagram of the image processing system shown in FIG. 13, in which additional blender logic is used to process pixels stored in the frame buffer before displaying the pixels.

In a further embodiment of the present invention, as shown in FIG. 17, the image processing system comprises blender logic means 110 coupled to the frame buffer 60. The display controller 30, which is the same as shown in FIG. 13, has performed the described processing of input pixels, which has resulted in forming a combined image stored in the frame buffer 60. The blender logic means 110 reads the pixels from the frame buffer means 60 and propagates the pixels further to, for instance, the display generator 70 of FIG. 3. Additionally, the blender logic means 110 blends, for pixels in the mixing area, the values read from both selections of storage locations before propagating the pixels. This achieves a good level of mixing, also when the display is viewed from nearby as usually is the case for computer displays. To achieve this, the blender logic means 110 comprises input means 112 for reading a stream of pixels from the frame buffer 60. The blender logic means 110 further comprises means 114 for blending the value read from the first selection of bit storage locations with the value read from the second selection of bit storage locations. Assuming that the chosen selections of bit storage locations are as shown in FIG. 14, the blending can for instance be performed as follows:

Extract the four most significant bits of the foreground input pixel from the four most significant bit storage locations by performing a bit-wise AND operation on the pixel intensities, using the hexadecimal mask 'F0'. Store the resulting value in a first register.

Extract the four most significant bits of the background input pixel from the four least significant bit storage locations by performing a bit-wise AND operation on the pixel intensities, using the hexadecimal mask '0F'. Multiply the value by 16 (shift four bit positions) to ensure that the bits are stored in the most significant nibble. Store the resulting value in a second register.

Calculate the average of the values stored in both registers, by dividing both registers by two (shift operation) and adding the values together.

The resulting blended pixel is the average of both values. The mask patterns may be fixed, or, alternatively, may be supplied by an external controller, such as the display controller 30 or CPU 50, shown in FIG. 3. Also included in the blender logic means 110 is output means 116 for propagating pixels. The information stored in the composition memory 34 is used to determine whether a pixel received via the input 112 is part of the mixing area or not. If the pixel is part of the mixing area, then the blended pixel is propagated. If the pixel is not part of the mixing area then the pixel is propagated unblended.

It will be recognised that the role of the blender logic means 110, in an alternative embodiment can be conveniently combined with the display controller 30.

If no blender logic means 110 is used before displaying the stored pixels, the mixing could appear rather crude. As an example, if the most significant bit storage location is used for storing a bit of a foreground image pixel, then this bit would contribute half of the intensity of the resulting combined pixel. A marginal change in intensity of the foreground image pixel, resulting in a change of the bit, could result in a significant change of the intensity of the combined pixel. On the other hand, substantial changes in the intensity of the background pixel, could result in only small changes of the intensity of the combined image pixel. In an alternative embodiment of the present invention, therefore, two methods are used to achieve a good level of mixing without using the blender logic means 110. The first method comprises assigning the selections of bit storage locations in such a way that an input pixel can contribute a value to the combined pixel which is near the required mixing level. As an example, in FIG. 14 the four most significant storage locations have been assigned to the background image. This limits the contribution of the background image pixel to a maximum intensity of 15, which may only be approximately 1/16th of the maximum intensity of the combined pixel (approximately 1/16th of the maximum intensity of 255). Consequently, the maximum achievable mixing level of input pixels with a high intensity is approximately $\alpha=1/16$. For input pixels with a low intensity level, for instance less than 1/8th of the maximum intensity, a mixing level of $\alpha=0.5$ can still be approximated.

Figure 18:
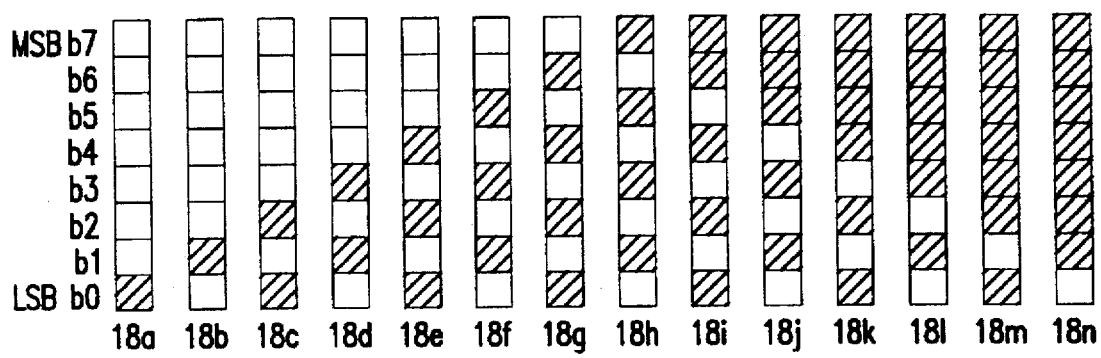
FIG. 18 illustrates various alternative bit storage location patterns.

FIG. 18 shows 14 possible selections. The bit storage locations which form the second selection (assigned to the background image) are shown using a hatched pattern. Persons skilled in the art will be able to choose the selection which best suits the required mixing level and the nature of the input image, depending on the distribution and range of intensity levels used by the image. Obviously, other selections than the ones shown in FIG. 18 can be used as well.

The second method for achieving a good level of mixing without using blending logic relates to determining an optimum contribution of each foreground and background input pixel before storing this contribution in the applicable bit storage locations. A simple method of assigning the input pixels to the bit storage locations is to store as many most significant bits of the input pixel as storage locations have been assigned to the input pixel. This method has the disadvantage that the contribution is not optimal for the desired mixing level. As an example, assume that the bit storage locations have been assigned according to the selection shown in FIG. 18g, with the most significant bit being assigned to the foreground pixel. Assume, further, that the foreground pixel has maximum intensity level, 255, and that the preferred mixing level is $\alpha=0.5$. Storing the four most significant bits of the foreground pixel would result in a contribution of 170 (128+32+8+2) to the intensity of the combined pixel. In this case a preferred contribution of 128 can be achieved by setting only the most significant bit of the combined pixel. Similarly, for all intensity levels and all required mixing levels an optimum contribution can be determined.

Persons skilled in the art will recognise that particularly good mixing results can be achieved by combining both methods. This can, for instance, be achieved in the following manner:

Analyze the nature of the input images on aspects such as distribution and range of intensity levels used by the various image types (for instance: teletext images have a different nature than full motion video images).

Decide on the required mixing levels.

Calculate for a range of selections the mixing level which is achieved for every possible pixel intensity.

Calculate the average mixing level using the distribution information of the various image types.

Choose, for every image type, the selection which achieves the average mixing level closest to the desired mixing level.

Process the input image pixels according to the chosen selection and propagate optimum contributions. Obviously, the last step will be typically performed by the processing means 36 of FIG. 16. Some of the other steps may be best performed once, for instance using a general purpose computer. The CPU 50 of FIG. 3 can then be programmed to supply the selection information to the display controller 30, whenever a new image type needs to be processed by the display controller 30.

I claim:

1. An image processing system for processing background and foreground images and storing a combined image in a shared frame buffer, said image processing system comprising:

frame buffer means;

display controller means coupled to said frame buffer means, said display controller means comprising:

input means for receiving input pixels including digital background input pixels which form a background input image and digital foreground input pixels which form at least one foreground input image and for differentiating between the digital background and digital foreground input pixels; and processing means for processing the digital background and digital foreground input pixels and for propagating a stream of processed pixels to memory elements of said frame buffer means so as to form a combined image; and means for determining whether a position in said combined image is part of a predetermined background area, a predetermined foreground area or a predetermined mixing area, said mixing area comprising mixing area positions, said mixing area positions being positions in the combined image which correspond to a predetermined area of a corresponding foreground image, said foreground area comprising foreground area positions, said foreground area positions being positions in the combined image which correspond to the foreground image and which are not part of said mixing area, and said background area comprising background area positions, said background area positions being positions in the combined image which correspond to the background image and which are not part of said mixing area or said foreground area, said display controller means further comprising:

means for determining a corresponding image position for each input pixel;

means for determining a corresponding memory element for each image position;

means for processing the digital foreground input pixels by propagating the digital foreground input pixels to the corresponding memory elements, if the input pixels correspond to foreground area positions, and by propagating a representative portion of the digital foreground input pixels to the corresponding memory elements, if the input pixels correspond to mixing area positions; and means for processing said background input pixels by propagating the background pixels to the corresponding memory elements, if the input pixels correspond to background area positions and by propagating a representative portion of the background pixels to the corresponding memory elements, if the input pixels correspond to mixing area positions.

2. An image processing system as claimed in claim 1, wherein said mixing area comprises positions in the combined image which correspond to a predetermined edge area of the corresponding foreground image.

3. An image processing system as claimed in claim 1, wherein:

said display controller means comprises means for dividing the mixing area positions into a first selection and a second selection;

said representative portion of foreground pixels comprises the foreground pixels which correspond to said first selection of mixing area positions; and said representative portion of background pixels comprises the background pixels which correspond to said second selection of mixing area positions.

4. An image processing system as claimed in claim 3, wherein said dividing of mixing area positions comprises assigning neighbouring positions substantially alternatingly to said first selection and said second selection.

5. An image processing system as claimed in claim 3, wherein said image processing system further comprises:

delay means coupled to said frame buffer means; and blender logic means coupled to said delay means and said frame buffer means, said delay means having means for receiving a stream of pixels from said frame buffer means and means for generating the same stream of pixels with a time delay of one pixel;

said blender logic means comprising first and second input means, blending means, and output means;

said first input means having means for reading a stream of pixels from said frame buffer;

said second input means having means for reading a stream of pixels from said delay means;

said blending means having means for blending a pixel received by said first input means with a pixel received by said second input means, forming a blended pixel; and said output means having means for propagating said blended pixel if a pixel of the stream of pixels received by said first input means corresponds to a mixing area position and means for propagating the pixel of the stream of pixels received by said first input means if the pixel corresponds to a foreground area position or a background area position.

6. An image processing system as claimed in claim 1, wherein:

said input pixels comprise a plurality of bits;

said memory elements of said frame buffer comprise substantially the same amount of bit storage locations as said plurality of input pixel bits;

said display controller means comprises means for dividing the bit storage locations of the memory elements, which correspond to the mixing area positions, into a first selection and a second selection;

said representative portion of the digital foreground input pixels, which correspond to the mixing area positions, comprises a representative part of each digital foreground input pixel, which is being propagated to said first selection of bit storage locations of the corresponding memory elements; and said representative portion of digital background input pixels, which correspond to the mixing area positions, comprises a representative part of each digital background input pixel, which is being propagated to said second selection of bit storage locations of the corresponding memory elements.

7. An image processing system as claimed in claim 6, wherein said first selection of bit storage locations of a memory element of said memory elements comprises substantially half the amount of bit storage locations available in the memory element of said memory elements.

8. An image processing system as claimed in claim 2, wherein said first selection of bit storage locations of the memory element comprises more than half the amount of bit storage locations available in a memory element of said memory element if the corresponding position is nearer the foreground area than the background area, and said first selection of bit storage locations of the memory element comprises less than half the amount of bit storage locations available in the memory element if the corresponding position is nearer the background area than the foreground area.

9. An image processing system as claimed in claim 6, wherein:

said representative part of the digital foreground input pixel comprises the most significant bits of the digital foreground input pixel; and said representative part of the background input pixel comprises the most significant bits of the background input pixel.

10. An image processing system as claimed in claim 6 wherein said image processing system further comprises:

means for determining said representative part of the digital foreground input pixel by choosing a value which contributes, to the combined image, substantially half a value of the digital foreground input pixel when stored in the first selection of bit storage locations; and means for determining said representative part of the digital background input pixel by choosing a value which contributes to the combined image substantially half the value of the digital background input pixel when stored in the second selection of bit storage locations.

11. An image processing system as claimed in claim 7, wherein:.

said image processing system comprises blender logic means coupled to said frame buffer means, said blender logic means comprising input means, blending means and output means;

said input means having means for reading a stream of pixels from said frame buffer;

said blending means having means for blending the value read from said first selection of bit storage locations with the value read from said second selection of bit storage locations, forming a blended pixel;

said output means having means for propagating said blended pixel if a pixel of the stream of pixels received by said first input means corresponds to a mixing area position and for propagating the pixel received by said first input means if the pixel corresponds to a foreground area position or a background area position.

12. An image processing system as claimed in claim 2, wherein said edge area has a width of 2 to 4-pixels.

13. An image processing system as claimed in claim 4, wherein:

said image processing system further comprises:

delay means coupled to said frame buffer means; and blender logic means coupled to said delay means and said frame buffer means, said delay means having means for receiving a stream of pixels from said frame buffer means and means for generating the same stream of pixels with a time delay of one pixel;

said blender logic means comprising first and second input means, blending means, and output means;

said first input means having means for reading a stream of pixels from said frame buffer;

said second input means having means for reading a stream of pixels from said delay means;

said blending means having means for blending a pixel received by said first input means with a pixel received by said second input means, forming a blended pixel;

said output means having means for propagating said blended pixel if the pixel received by said first input means corresponds to a mixing area position and for propagating the pixel received by said first input means if the pixel corresponds to a foreground area position or a background area position.

14. An image processing system as claimed in claim 6, wherein said first selection of bit storage locations of the memory element comprises more than half the amount of bit storage locations available in the memory element if the corresponding position is nearer the foreground area than the background area, and comprises less than half the amount of bit storage locations available in the memory element if the corresponding position is nearer the background area than the foreground area.

15. An image processing system as claimed in claim 7, wherein:

said representative part of the foreground input pixel comprises the most significant bits of the foreground input pixel; and said representative part of the background input pixel comprises the most significant bits of the background input pixel.

16. An image processing system as claimed in claim 8, wherein:

said representative part of the foreground input pixel comprises the most significant bits of the foreground input pixel; and said representative part of the background input pixel comprises the most significant bits of the background input pixel.

17. An image processing system as claimed in claim 7, wherein said image processing system further comprises:

means for determining said representative part of the foreground input pixel by choosing a value which contributes to the combined image substantially half the value of the foreground input pixel when stored in the first selection of bit storage locations; and means for determining said representative part of the background input pixel by choosing a value which contributes to the combined image substantially half the value of the background input pixel when stored in the second selection of bit storage locations.

18. An image processing system as claimed in claim 8, wherein said image processing system further comprises:

means for determining said representative part of the foreground input pixel by choosing a value which contributes to the combined image substantially half the value of the foreground input pixel when stored in the first selection of bit storage locations; and means for determining said representative part of the background input pixel by choosing a value which contributes to the combined image substantially half the value of the background input pixel when stored in the second selection of bit storage locations.

19. An apparatus including an image processing system for processing background and foreground images and storing a combined image in a shared frame buffer, said image processing system comprising:

frame buffer means;

display controller means coupled to said frame buffer means, said display controller means comprising:

input means for receiving input pixels including digital background input pixels which form a background input image and digital foreground input pixels which form at least one foreground input image and for differentiating between the digital background and digital foreground input pixels;

processing means for processing the digital background and digital foreground input pixels and for propagating a stream of processed pixels to memory elements of said frame buffer means so as to form a combined image; and means for determining whether a position in said combined image is part of a predetermined background area, a predetermined foreground area or a predetermined mixing area, said mixing area comprising mixing area positions, said mixing area positions being positions in the combined image which correspond to a predetermined area of a corresponding foreground image, said foreground area comprising foreground area positions, said foreground area positions being positions in the combined image which correspond to the foreground image and which are not part of said mixing area, and said background area comprising background area positions, said background area positions being positions in the combined image which correspond to the background image and which are not part of said mixing area or said foreground area, said display controller means further comprising:

means for determining a corresponding image position for each input pixel;

means for determining a corresponding memory element for each image position;

means for processing the digital foreground input pixels by propagating the digital foreground input pixels to the corresponding memory elements, if the input pixels correspond to foreground area positions, and by propagating a representative portion of the digital foreground input pixels to the corresponding memory elements, if the input pixels correspond to mixing area positions; and means for processing said background input pixels by propagating the background pixels to the corresponding memory elements, if the input pixels correspond to background area positions and by propagating a representative portion of the background pixels to the corresponding memory elements, if the input pixels correspond to mixing area positions.

\* \* \* \* \*